Jan. 27, 1925.

J. E. WOOD ET AL 1,524,608

AUTO WHEEL JACK

Filed Sept. 8, 1922

Inventors
J. E. Wood and
K. P. Hogan,

By

Attorney

Patented Jan. 27, 1925.

1,524,608

UNITED STATES PATENT OFFICE.

JAMES E. WOOD AND KENNETH P. HOGAN, OF EDENTON, NORTH CAROLINA.

AUTO WHEEL JACK.

Application filed September 8, 1922. Serial No. 586,956.

*To all whom it may concern:*

Be it known that JAMES E. WOOD and KENNETH P. HOGAN, citizens of the United States of America, residing at Edenton, in the county of Chowan and State of North Carolina, have invented new and useful Improvements in Auto Wheel Jacks, of which the following is a specification.

The object of the invention is to provide a simple and efficient wheel jack for automobiles and similar vehicles as a means for facilitating the raising of a wheel axle and adjacent portions of the car or vehicle to relieve a wheel and its tire from vehicle supporting pressure to permit, for example of replacing the tire or effecting other changes or repairs incident to the care of such vehicles; and more particularly to provide a device for the indicated purpose which is of extremely simple construction minimizing the cost of manufacture and therefore the expense to the consumer, which is of such dimensions as to permit of its being carried with facility on the car and preferably in the tool box or kit, which may be adapted to perform its function of effectively raising the wheel of a vehicle without involving any manipulation or adjustment on the part of the operator, which may be operated to effect the raising of a vehicle wheel by the power of the car as in causing a limited forward or retrograde movement thereof, which in its operation with relation to a vehicle will not involve any objectionable strain upon any of the elements of the structure such as the wheel or axle and will not involve the marring or disfigurement of the same regardless of the refinement or finish or decoration of the vehicle, and which will operate with like facility in connection with either hard or surfaced roadways; and with these objects in view the invention consists in a construction and combination of parts of which a preferred embodiment is shown in the accompanying drawings, wherein:—

The device consists essentially of a foot or base 10, a head 11 and a connecting stem 12, rigidly connected and integral if desired, the construction being such as to permit of production by forging or casting.

Figure 1:
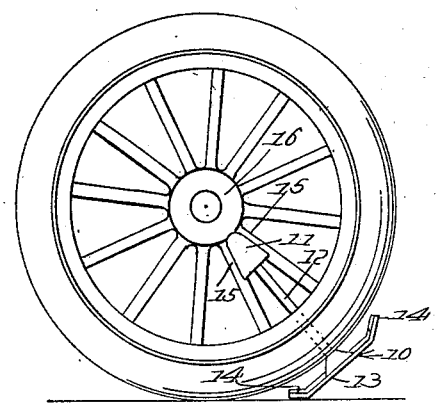
Figures 1 and 2 are side views of a jack embodying the invention applied in the operative position to a vehicle wheel and disposed respectively in the positions which the jack assumes immediately prior to and after the elevation of the wheel.

The foot preferably consists of a flat base or body portion 13 having up-turned extremities or runner ends 14 forming initial bearing elements for contact with the supporting surface such as the ground or floor as the vehicle wheel is elevated thereon, as indicated in Figure 1. The stem 12 rises from one side edge of the base or body portion of the foot and is disposed substantially in the plane of said side edge while being inclined or deflected slightly over the plane of the foot to dispose the head 11 in overhanging relation with the foot as indicated in Figure 3 and sufficiently close to the vertical plane of the free edge of the foot to provide against any interference with the operation of removing a tire when the wheel has been elevated to the position indicated in Figure 2. The jack being placed on the inner side of the plane of the wheel, the construction and relative arrangement of the parts of the device are such that when the wheel is elevated there is no projection outwardly beyond the plane of the rim to interfere with the movements of the operator in working on the tire.

Figure 2:
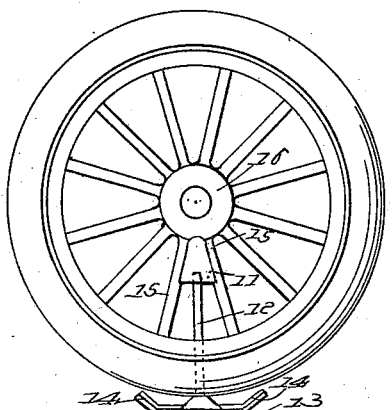
Figure 3:
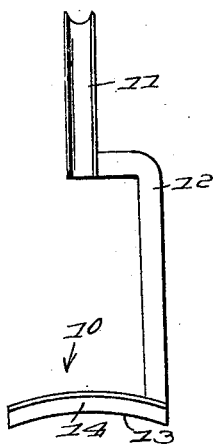
Figure 3 is an edge view.
Figure 4:
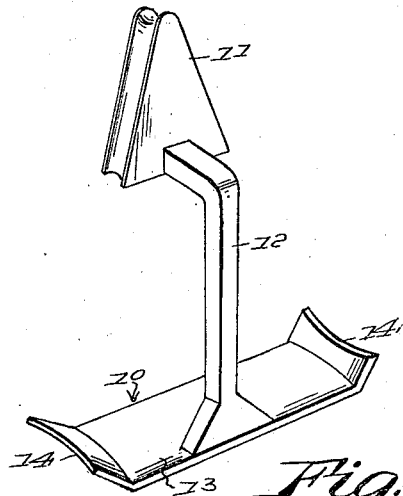
Figure 4 is a perspective view of the jack.

The head 11 is of wedge shape merely for the purpose of effecting such an engagement with the adjacent spokes 15 of the vehicle wheel as to prevent relative outward and inward movement of the jack when applied thereto and insure the movement of the jack with the wheel as the latter is operated from the position indicated in Figure 1 to that shown in Figure 2. The bearing of the head 11 to support the weight of the structure due to the action of the jack is imposed upon the hub 16 of the wheel between the spokes with which the downwardly divergent edge portions of the head are engaged, said edge portions being channeled or grooved slightly as indicated to fit the curvature of the spokes to prevent outward and inward swinging movement of the jack in the elevating operation above indicated.

Thus it will be seen that the head while engaged in a sense with the spokes of the wheel which is to be raised by the jack, contacts with said spokes at the inner ends thereof close to the hub and therefore where the spokes are best adapted to resist lateral strain without distortion or displacement or tendency to fracture, and that moreover the weight supporting bearing of the head is at its apex and is in contact with the surface of the hub between the spokes which serve to retain the head in position. The head thus has an interlocking relation with the spokes between which it is inserted as a means of holding it in the proper position to apply weight supporting pressure to the hub, without in any way serving as an agency in sustaining the weight or load, and as a consequence without exposing the wheel of the vehicle to the risk of injury by the distortion or breakage. The relatively extended flat bearing on the ground or other surface afforded by the base or body portion of the shoe moreover insures a truly vertical position of the stem and thus serves to minimize any tendency of the jack to impose lateral pressure upon the spokes between which the head is arranged.

Furthermore, as indicated, the foot may be transversely arched to provide for finding a substantial seat on an uneven surface, the inner and outer edges of the foot serving to form a bearing and to more or less bite into the supporting surface to insure stability of the structure in supporting the weight imposed thereon.

Figure 5:
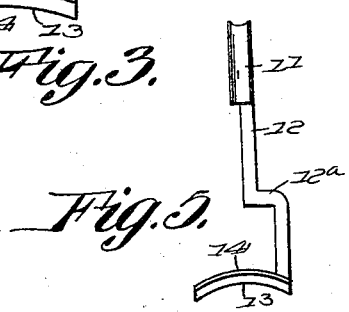
Figure 5 is an edge view of a slightly modified form of the jack designed particularly for use in connection with cars having large break bands.

Furthermore in Figure 5 there is shown a slight modification of the jack wherein an offset or shoulder 12ª is made in the stem or standard close to the plane of the foot and of a depth sufficient to provide for the application of the jack to vehicles having unusually large break bands. It will be understood that this and other changes in the details of form and proportion may be varied to suit the conditions under which the device may be employed.

Having described the invention, what is claimed as new and useful is:—

1. A vehicle wheel jack of rigid construction including a foot upwardly curved transversely to assume a position under the wheel, the longitudinal edges thereof adapted to bite into the road-bed, thereby preventing lateral slipping, the ends of the foot being upturned, the edges of the upturned portions being curved to more readily conform to the curvature of the wheel tire, as the foot assumes a position under the wheel, a stem rising from the foot at one side edge thereof with its upper end inwardly deflected, whereby its inner terminal end may assume a position directly under the center of the hub, and a head integral with the inner terminal of the deflected part of the stem, said head being provided with a terminal reduced bearing for contact with the surface of the wheel hub between the inner ends of adjacent spokes thereof, thereby supporting the weight of the vehicle and relieving spreading strain on the spokes, said head having means for interlocking engagement with said adjacent spokes to prevent lateral displacement.

2. A vehicle wheel jack of rigid construction including a foot upwardly curved transversely to assume a position under the wheel tire and whereby the longitudinal edges may engage in the road-bed to prevent lateral displacement of the foot, said foot having upturned ends correspondingly curved transversely, the upturned ends having curved terminal edges to conform to the wheel tire to clear the same on the elevation of the wheel, a stem rising from the foot at one side edge thereof with its upper end inwardly deflected, whereby its inner terminal end may assume a position under the center of the hub of the wheel, a head connected to the inner terminal of the deflected portion, said head being provided with an apex bearing for contact with the surface of the vehicle wheel hub between the inner ends of adjacent spokes, said head having downwardly deflected side edges provided with means for interlocking engagement with said adjacent spokes.

3. A vehicle wheel jack of rigid construction including a foot upwardly curved transversely to assume a position under the wheel tire, a stem rising from the foot at one side edge thereof with its upper end inwardly deflected, whereby its inner terminal end may assume a position directly under the center of the hub of the wheel, and a solid triangular head integral with the inner terminal of the deflected part of the stem and having certain of its tapered edges curved to receive and engage with the inner portions of the spokes of the wheel, said triangular head having a crotch at its apex, the stem being of a height to cause the crotch to engage with the hub when the foot is positioned under the wheel, thereby supporting the weight of the vehicle and relieving spreading strain on the spokes.

In testimony whereof they affix their signatures.

JAMES E. WOOD.
KENNETH P. HOGAN.